United States Patent Office 3,645,967
Patented Feb. 29, 1972

3,645,967
PHOTOCHROMIC COMPOUND
Walter Ried, Frankfurt am Main, and Arthur Heinrich Schmidt, Wiesbaden, Germany, assignors to Kalle Aktiengesellschaft, Wiesbaden-Biebrich, Germany
No Drawing. Filed Jan. 19, 1970, Ser. No. 4,130
Claims priority, application Germany, Nov. 21, 1969, P 19 58 485.1
Int. Cl. C07c *69/78*
U.S. Cl. 260—476 R          14 Claims

ABSTRACT OF THE DISCLOSURE

This invention relates to novel photochromic compounds and to radiation-sensitive recording materials incorporating the said compounds.

---

This invention relates to photochromic compounds and to radiation-sensitive recording material containing these compounds as radiation-sensitive substances.

The use of photochromic compounds in radiation-sensitive materials is known. The compounds hitherto suggested for this purpose, however, have certain disadvantages. They can be obtained only with difficulty, the selection of the color shades achieved therewith is limited, or the light-sensitivity is not sufficient for some purposes.

A new group of photochromic compounds now has been found which are excellently suitable for use in light-sensitive materials. The compounds can be prepared in a comparatively simple manner with good yields. By slight changes in their structures, colored products with different color shades can be obtained.

The present invention provides a photochromic compound of the general Formula A

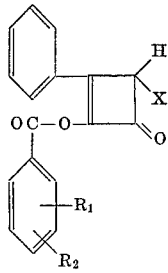

in which $R_1$ and $R_2$ are hydrogen, halogen or alkyl, and
X is halogen.

The present invention further provides a radiation-sensitive recording material containing such photochromic compounds as the radiation-sensitive substance.

The compounds can be prepared according to the process described in Tetrahedron Letters, 1969, pages 1443 to 1446, for some representatives. The preparation is performed by the reaction of aroyl halide with phenyl cyclobutenedione, if desired in the presence of a catalyst, e.g. zinc chloride. The acid iodides generally react very rapidly without the addition of zinc chloride, the bromides and particularly the chlorides advantageously are reacted in the presence of a catalyst in order to achieve good yields. Because of its good effect and its low price, anhydrous zinc chloride has proved to be the preferred catalyst. Other Lewis acids also are suitable as catalysts, e.g. zinc bromide, borofluoride, and the like. The reaction generally is performed in the simplest manner indicated in the aforementioned reference without the addition of a solvent, the finely powdered phenyl cyclobutenedione advantageously being mixed with the catalyst and reacted with the liquid or molten acid halide.

Depending on the kinds and positions of the substituents, the compounds yield light-yellow to deep-red colored exposure products upon exposure to actinic light. When stored for a relatively long time or when briefly heated, the colorless original compound is reformed, which upon exposure to light, again yields the colored product.

The photochromic color formation of the compounds of the invention occurs only in the solid state. Consequently, decoloration also can be performed with solvents or solvent vapors or can be accelerated by the action of solvent vapors. Color formation occurs by the action of daylight and proceeds particularly rapidly in the case of long-wave ultraviolet light in the wavelength range of about 350 nm. Shorter wavelengths also effect photochromic color formation but, in the case of wavelengths below 300 nm., a usually undesirable irreversible light reaction occurs which leads to colorless decomposition products. This byreaction can be observed after a very frequent change of exposure to short-wave ultraviolet light and decoloring by a gradual decrease of the achievable color depth. This phenomenon can be inhibited by the use of suitable light sources or filters so that exposure to light is performed only by means of radiation above about 320 nm. In this case, even after very frequent exposure and decoloring, no decrease in contrast is observed.

The compounds can be used in the production of all kinds of light-sensitive recording and reproduction materials in which a visible color formation is desired, the color being capable of being reversibly removed. If permanent copies are desired, they can be obtained in known manner by making further copies of the copies obtained in accordance with the invention.

The compounds advantageously are aplied to suitable supports as finely divided dispersions in binder solutions. Suitable supports are, e.g., paper, metal foils, synthetic plastic films, screens, and the like. It is also possible to apply the compounds to the support from a solution in a suitable organic solvent and induce crystallization by thorough drying. It is also possible to prepare a dispersion suitable for coating by preparing a solution of the photochromic compound in a solvent miscible with water and mixing the solution, with vigorous stirring, with an aqueous binder solution.

It is possible to produce reproduction materials in accordance with the invention which contain the photochromic compounds as the only light-sensitive substances. The photochromic compounds advantageously also can be combined with other light-sensitive systems which, themselves, yield no image-wise color formation but another light reaction, e.g. a photopolymerization. In this case, the photochromic substances serve as indicators for the kind, sharpness, degree of exposure to light, and the like. In this manner, it is possible to ascertain before development whether, for example, a reproduction material for the preparation of printing forms and the like has been appropriately exposed to light.

The compounds used in accordance with the invention are also suitable for recording other kinds of radiation, e.g. electron radiation, radioactive radiation and the like. Care should be taken, however, not to maintain the reversibility of the photochromic properties without limit when using radiation greater in energy than ultraviolet light of a wavelength of about 300 nm.

The invention will be further illustrated by reference to the following specific examples:

EXAMPLES 1 TO 9

The compounds of Formulae I to IX (Table 2, below) were each very finely powdered in a mortar and the powder was reacted with 30 times by weight of a 25 percent by weight aqueous solution of polyvinyl alcohol (degree of saponification 88 percent, viscosity 3.1 to 5 cps. in the case of a 4 percent aqueous solution at 20° C.). After the addition of a drop of non-ionogenic wetting agent (polyoxyethylene nonyl phenyl ether with 10 to 12 oxyethylene units) the mixture was homogenized and applied to a suitable support, i.e., baryta paper, and dried.

When using yellow light, practically colorless coatings are obtained.

The reproduction materials obtained were exposed, in contact with a transparent original, to a tubular exposure device of Moll Kunststofftechnik, Solingen-Wald, Germany, containing 13 fluorescent tubes (TL–AK 40W–0.5) of Messrs. Philips, Eiendhoven, Holland, on an area of 60 x 60 cm. After exposure to light for 5 to 10 seconds at a distance of 7 cm., negative images of the original were obtained in the colors indicated in Table 1, below. The copies were decolored again by heating on a plate at 93° C. The necessary decoloration times are indicated in Table 1. Decoloration was performed until about 95 percent of the original color density had disappeared.

Decoloration also can be performed in contact with hot rollers or in a hot-air stream. It also can be considerably accelerated by the action of solvents or warm solvent vapors which completely or partially dissolve the compounds, but subsequent complete removal of the solvent is necessary for reestablishing the light-sensitivity.

TABLE 1

| Compound Nos. | Exposure color shade | Duration of decoloration at 93° C. |
|---|---|---|
| I | Orange yellow | |
| II | Orange | 30 seconds. |
| III | Red orange | |
| IV | Orange red | |
| V | Carmine red | 2.5 minutes. |
| VI | do | 2.5 minutes. |
| VII | Orange red | 3 minutes. |
| VIII | Red orange | 20 seconds. |
| IX | Pink | <10 seconds. |

The duration of decoloration of Compounds I, II, and IV was not determined under the conditions indicated. Spontaneous decoloration at room temperature, however, indicates that these compounds are approximately between Compounds II and VII. The samples could be exposed to light and decolored again 20 times without a loss of light-sensitivity.

Compounds I to IX were prepared as follows:

1.59 g. (0.01 mole) of phenyl cyclobutenedione were very finely powdered and mixed with about 100 mg. of freshly molten zinc chloride. The equimolar quantity of the liquid or liquefied acid halide was dropped into the mixture and the entire mixture was stirred until a homogeneous mass was obtained. The reaction mixture was left standing at about 30 to 35° C., until the initially movable mass solidified. The reaction product was ground in a mortar and recrystallized from acetone.

EXAMPLE 10

A light-sensitive material produced according to Example 8 was exposed, without an original, to the light source indicated therein until it was considerably colored. In contact with a silver film negative and with the emulsion side of the latter facing the reproduction layer, it was then passed through a commercial thermographic copying device in which the infrared radiation was focussed onto the plane of the original.

A positive image was obtained by image-wise decoloration under the black areas of the original.

The image obtained, or an image produced according to one of the Examples 1 to 9, could be decolored in the same device by passing it therethrough together with a black film.

EXAMPLE 11

An electrolytically roughened aluminum foil was coated with the following mixture and dried:

2 parts by weight of a dispersion cross-linkable by light, prepared as described below, 1 part by weight of water, and 0.05 part by weight of the compound of Formula VII (Table 2, below) in a very finely powdered form.

Exposure was performed for 5 minutes, to the light source indicated in Examples 1 to 9. The exposed areas were intensively colored red.

The image was then developed by immersing and rinsing with methanol and dried, the color being diminished thereby. After hydrophilizing the non-image areas, the relief image obtained could be used as a printing form.

The light-sensitive dispersion was prepared as follows:

The solution of 4 parts by weight of the reaction product from 1 mole of nonyl phenol and 30 moles of ethylene oxide, 0.15 part by weight of the sodium salt of vinyl sulfonic acid, 0.25 part by weight of anhydrous sodium aceate, 2 parts by weight of the reaction product from polypropylene oxide having a molecular weight of 2,000 and 10 percent ethylene oxide, 1.5 parts by weight of a copolymer from N-vinyl-N-methyl-acetamide and di-(2-ethyl-hexyl)-maleate (80:20; K value 48 in methanol) and 0.42 part by weight of potassium persulfate in 105 parts by weight of water was heated to 80° C. in a reaction vessel. A mixture of 67 parts by weight of vinyl acetate, 33 parts by weight of dibutyl maleate, and 2 parts by weight of 4-acryloxy-benzophenone was then dropwise added. After this addition, a solution of 0.1 part by weight of potassium persulfate in 2.5 parts by weight of water was added, the mixture was heated for another 2 hours and then cooled to room temperature.

EXAMPLE 12

A mechanically roughened aluminum foil was coated with a solution containing 5 percent by weight of the 2-diazo-1-naphthol-5-sulfonic acid ester of 4-tert.-butylphenol and 1 percent by weight of the compound of Formula VII (Table 2, below) in a mixture of 8 parts by volume of ethylene glycol monomethyl ether and 2 parts by volume of butyl acetate. The material was dried overnight and then image-wise exposed to light under a positive original. The light-struck areas were colored red. The red color could not be easily removed by heating. A positive planographic printing form was obtained by development with an aqueous alkaline developer solution.

Table 2 below illustrates exemplary compounds of general Formula A which were prepared and tested for their suitability as photochromic substances in accordance with the invention. Insofar as they have identifiable melting points, these are indicated.

TABLE 2

| Formula No.: | $R_1$ | $R_2$ | X | Melting point, ° C. |
|---|---|---|---|---|
| I | 2-fluorine | H | Cl | 99–102 |
| II | 4-fluorine | H | Cl | |
| III | 2-chlorine | H | Cl | |
| IV | 3-chlorine | H | Cl | |
| V | 4-chlorine | H | Cl | |
| VI | 4-bromine | H | Cl | |
| VII | 4-methyl | H | Cl | |
| VIII | do | H | Br | |
| IX | do | H | I | |
| X | hydrogen | H | Br | 136–138 |
| XI | do | H | I | 118–119 |
| XII | do | H | Cl | 118–120 |
| XIII | 4-chlorine | 2-Cl | Cl | 124–126 |

It will be obvious to those skilled in the art that many modifications may be made within the scope of the present invention without departing from the spirit thereof, and the invention includes all such modifications.

What is claimed is:

1. A compound having the formula

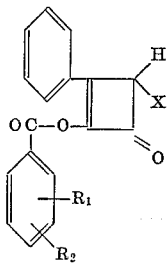

in which $R_1$ and $R_2$ are selected from the group consisting of hydrogen, halogen, and lower alkyl, and X is halogen.

2. A compound having the formula

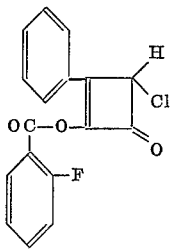

3. A compound having the formula

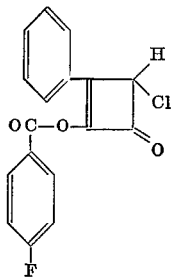

4. A compound having the formula

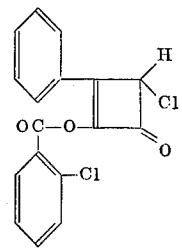

5. A compound having the formula

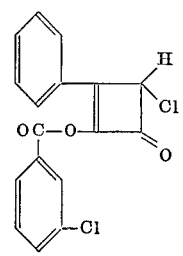

6. A compound having the formula

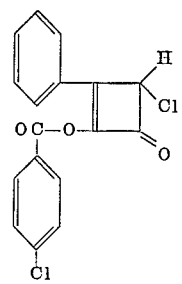

7. A compound having the formula

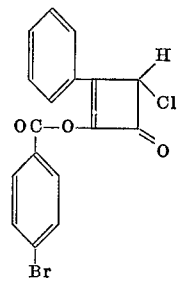

8. A compound having the formula

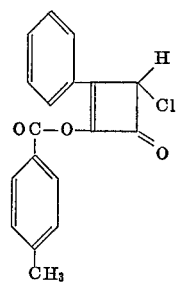

9. A compound having the formula

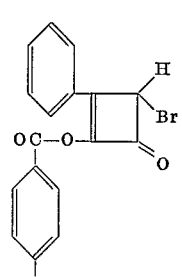

10. A compound having the formula

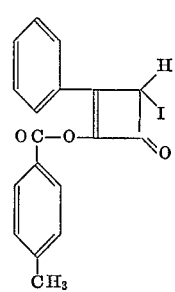

11. A compound having the formula

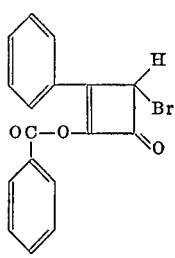

12. A compound having the formula

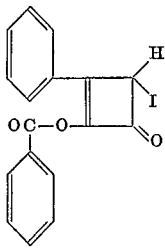

13. A compound having the formula

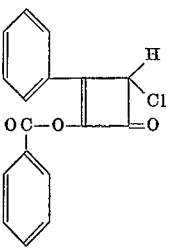

14. A compound having the formula

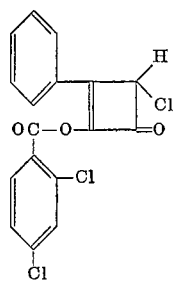

References Cited
UNITED STATES PATENTS

| | | | |
|---|---|---|---|
| 3,410,892 | 11/1968 | Martin | 260—476 R |
| 3,379,770 | 4/1968 | Elam et al. | 260—476 |
| 3,345,402 | 10/1967 | Martin | 260—476 |

OTHER REFERENCES

Journal of the American Chem. Soc., vol. 85, 1963, pp. 3502-3505, Vega et al.

Tetrahedron Letters, 1969 (19), 1443-6, Reed et al.

LORRAINE A. WEINBERGER, Primary Examiner

J. L. DAVISON, Assistant Examiner

U.S. Cl. X.R.

96—90 PC